US012436048B1

United States Patent
Sun et al.

(10) Patent No.: US 12,436,048 B1
(45) Date of Patent: Oct. 7, 2025

(54) BOLT AXIAL FORCE MEASUREMENT METHOD, DEVICE, APPARATUS, AND READABLE STORAGE MEDIUM

(71) Applicants: Guangzhou Municipal Engineering Testing Co., Ltd., Guangzhou (CN); Guangzhou Institute of Building Science Group Co., Ltd., Guangzhou (CN)

(72) Inventors: Xiaoli Sun, Guangzhou (CN); Zhiguo Zhou, Guangzhou (CN); Jun Yang, Guangzhou (CN); Sijia Zhu, Guangzhou (CN); Linbin Wang, Guangzhou (CN); Feng Li, Xinjiang (CN)

(73) Assignees: GUANGZHOU MUNICIPAL ENGINEERING TESTING CO., LTD., Guangzhou (CN); GUANGZHOU INSTITUTE OF BUILDING SCIENCE GROUP CO., LTD., Guangzhou (CN)

( * ) Notice: Subject to any disclaimer, the term of this patent is extended or adjusted under 35 U.S.C. 154(b) by 0 days.

(21) Appl. No.: 19/213,462

(22) Filed: May 20, 2025

(30) Foreign Application Priority Data

Jun. 27, 2024 (CN) .......................... 202410841159.X

(51) Int. Cl.
*G01L 5/12* (2006.01)
*G01L 1/06* (2006.01)
*G01L 25/00* (2006.01)

(52) U.S. Cl.
CPC .................. *G01L 5/12* (2013.01); *G01L 1/06* (2013.01); *G01L 25/00* (2013.01)

(58) Field of Classification Search
CPC .............. G01L 5/12; G01L 1/06; G01L 25/00
See application file for complete search history.

(56) References Cited

U.S. PATENT DOCUMENTS

2016/0267645 A1\* 9/2016 Nakamura ............ G01L 5/0038

FOREIGN PATENT DOCUMENTS

| CN | 112539866 A | 3/2021 |
|---|---|---|
| CN | 117367652 A | 1/2024 |
| CN | 117419647 A | 1/2024 |

(Continued)

*Primary Examiner* — Tarifur R Chowdhury
*Assistant Examiner* — Akbar H. Rizvi
(74) *Attorney, Agent, or Firm* — Muncy, Geissler, Olds & Lowe, P.C.

(57) ABSTRACT

Disclosed herein is a bolt axial force measurement method, device, apparatus, and readable storage medium, the method comprises steps of: capturing an image of a bridge bolt; identifying an outer edge of a nut, a centroid of the nut, and a circular position of a laser spot in a captured image of the bridge bolt; projecting a calibration laser spot onto a bolt plate and obtaining a current frame as a bolt-detection image; performing dimensional calibration on the bolt-detection image and determining a displacement of each of the pre-calibrated feature points; calculating a bolt axial force value based on the displacement. The solution captures images of the bridge bolts and analyzes positions of each of the pre-calibrated feature points in the images; thus, the bolt axial force can be measured non-destructively, and non-rotational loosening of bolts can be identified.

16 Claims, 5 Drawing Sheets

(56) References Cited

FOREIGN PATENT DOCUMENTS

| | | |
|---|---|---|
| CN | 118154535 A | 6/2024 |
| JP | 2006194662 A | 7/2006 |
| KR | 20200049141 A | 5/2020 |
| WO | WO2022201897 A1 | 9/2022 |

* cited by examiner

BOLT AXIAL FORCE MEASUREMENT METHOD, DEVICE, APPARATUS, AND READABLE STORAGE MEDIUM

CROSS-REFERENCE TO RELATED APPLICATIONS

This application claims priority to Chinese application No. 202410841159.X having a filing date of Jun. 27, 2024, the entire contents of foresaid documents are hereby incorporated by reference.

TECHNICAL FIELD

The present disclosure relates to the field of bolt measurement, and more specifically, to a bolt axial force measurement method, device, apparatus, and readable storage medium.

BACKGROUND

Bolted connections are widely used in bridge structures to which the strength of bolts has a crucial effect on the stability and safety of bridges. As the service life of bridges increases, high-strength bolts used in the bridges may develop condensation; and rust, and are prone to loosening, leading to a reduction in axial force and endangering bridge safety. Therefore, whether bolts are loose is one of the regular measurement items for bridges and is included in the bridge technical condition assessment standards.

Regular measurement of bridge bolt axial force is essential. Common methods for detecting bolt loosening include the tapping measurement method and the ultrasonic axial force measurement method. The tapping measurement method involves using a tapping hammer to strike the bolt. Since the sound difference between a tightened bolt and a loosened bolt is significant, the tightness of the bolt may be evaluated by the tapping sound. However, this method heavily relies on the operator's skill, and the measurement results are not quantitative, such that misevaluation may occur easily. The ultrasonic axial force measurement method involves analyzing the intensity and time delay of the echo signal generated when ultrasonic waves pass through the bolt, to obtain a bolt axial force. However, a large number of bolts is are configured on a bridge, and an exhaustive measurement would require a significant amount of time. If each bolt is configured with an axial force monitoring apparatus, the cost of the apparatus would be too high. For existing bolt loosening measurement technologies based on image measurement, most principles are to determine the degree of bolt loosening and whether re-tightening is needed by measuring the rotation angle of the bolt. However, these methods can only determine whether the bolt is loose but cannot measure the axial force of the bolt.

However, during long-term use, various factors and their combined effects may cause bolts to exhibit obvious non-rotational loosening. For example, a first factor is preload loss, wherein a certain preload is generated when a bolt is tightened, thereby ensuring the tightness of the connection. However, long-term vibration may gradually reduce the friction between the bolt and the connected pieces, leading to a gradual loss of preload and ultimately causing non-rotational loosening of the bolt. A second factor is embedment effect, wherein there may be an embedment phenomenon occurring on the contact surface between the bolt and the connected pieces due to surface roughness or material properties. This embedment effect, under long-term vibration, especially in high-stress areas, may cause local plastic deformation of the contact surface, leading to non-rotational loosening. A third factor is material fatigue, wherein long-term vibration may cause fatigue in the material of the bolt and the connected pieces. This fatigue may manifest as micro-cracks or plastic deformation in the material, affecting the tightness of the bolt and causing non-rotational loosening. A fourth factor is environmental factor, wherein under long-term operation conditions of bridges, bolts are subjected to changes in temperature, humidity, and other environmental factors. High temperatures may cause uneven thermal expansion of the bolt material, and humidity may cause rust on the bolt, exacerbating non-rotational loosening. These loosening conditions cannot be detected by existing bolt loosening measurement technologies based on image detection, i.e., by measuring the rotation angle of the bolt.

Based on this, the present disclosure provides a bolt axial force measurement solution that can accurately measure the bolt axial force and identify non-rotational loosening of bolts.

SUMMARY

In view of this, the present disclosure provides a bolt axial force measurement method, device, apparatus, and readable storage medium. The technical solution captures images of bridge bolts and analyzes a position of each of the pre-calibrated feature points in the images, thus, the bolt axial force can be measured non-destructively, and non-rotational loosening of bolts can be identified.

An aspect of the present disclosure provides a bolt axial force measurement method, comprising steps of:
  capturing an image of a bridge bolt by a movable imaging device;
  identifying an outer edge of a nut, a centroid of the nut, and a circular position of a laser spot at a center of the bolt in the captured image of the bridge bolt;
  projecting a calibration laser spot onto a bolt plate and obtaining a current frame as a bolt-detection image when the outer edge of the nut, the centroid of the nut, and the circular position of the laser spot at the center of the bolt in the captured image of the bridge bolt meet preset conditions;
  performing dimensional calibration on the bolt-detection image based on a size of the calibration laser spot in the bolt-detection image and determining a displacement of each of the pre-calibrated feature points on the bolt in the bolt-detection image; and calculating a bolt axial force value based on the displacement of each of the pre-calibrated feature points on the bolt in the bolt-detection image.

Optionally, the step of performing dimensional calibration on the bolt-detection image based on the size of the calibration laser spot in the bolt-detection image and determining the displacement of each of the pre-calibrated feature points on the bolt in the bolt-detection image comprises:
  determining an actual size of the calibration laser spot based on the size of the calibration laser spot in the bolt-detection image in connection with a corresponding dimensional calibration curve;
  performing dimensional calibration in the bolt-detection image based on the actual size of the calibration laser spot; and
  reading a position of each of the pre-calibrated feature points on the bolt in the bolt-detection image dimensionally calibrated, and calculating the displacement of the pre-calibrated feature points on the bolt in the bolt-detection image.

Optionally, the step of reading a position of each of the pre-calibrated feature points on the bolt in the bolt-detection image dimensionally calibrated, and calculating the displacement of the pre-calibrated feature points on the bolt in the bolt-detection image comprises:

reading a position of each of the pre-calibrated feature points on the bolt in the bolt-detection image dimensionally calibrated; and calculating the displacement of each of the pre-calibrated feature points on the bolt in the bolt-detection image by establishing a position of the pre-calibrated feature point at the centroid of the nut of the bolt in the bolt-detection image as an origin of a polar coordinate.

Optionally, the pre-calibrated feature points comprise a midpoint of each side of the nut, a boundary point between the nut and screw, and a centroid of the nut.

Optionally, the step of calculating a bolt axial force value based on the displacement of each of the pre-calibrated feature points on the bolt in the bolt-detection image comprises:

obtaining a displacement-axial force curve according to a bolt type, where the displacement-axial force curve records a correspondence between the displacement of feature points and the bolt axial force value; and determining the bolt axial force value based on the displacement of each of the pre-calibrated feature points on the bolt in the bolt-detection image in connection with the displacement-axial force curve.

Optionally, the step of determining the bolt axial force value based on the displacement of each of pre-calibrated feature points on the bolt in the bolt-detection image in connection with the displacement-axial force curve comprises:

determining the axial force value at a position of each of the pre-calibrated feature points based on the displacement of each of the pre-calibrated feature points on the bolt in the bolt-detection image in connection with the displacement-axial force curve; and determining an average of the axial force values at positions of pre-calibrated feature points as the bolt axial force value.

Optionally, after the step of identifying the outer edge of a nut, the centroid of the nut, and the circular position of the laser spot at the center of the bolt in the captured image of the bridge bolt, the method further comprises step of:

adjusting a capturing position of the movable imaging device based on the identified outer edge of the nut, the centroid of the nut, and the circular position of the laser spot in the captured image of the bridge bolt.

Another aspect of the present disclosure provides a bolt axial force measurement device, comprising:

an image capturing unit for capturing an image of a bridge bolt by a movable imaging device;

an identification processing unit for identifying an outer edge of a nut, a centroid of the nut, and a circular position of a laser spot at a center of the bolt in the captured image of the bridge bolt;

an image obtaining unit for projecting a calibration laser spot onto a bolt plate and obtaining a current frame as a bolt-detection image when the outer edge of the nut, the centroid of the nut, and the circular position of the laser spot at the center of the bolt in the captured image of the bridge bolt meet preset conditions;

a dimensional calibration unit for performing dimensional calibration on the bolt-detection image based on a size of the calibration laser spot in the bolt-detection image and determining a displacement of each of the pre-calibrated feature points on the bolt in the bolt-detection image; and an axial force calculation unit for calculating a bolt axial force value based on the displacement of each of the pre-calibrated feature points on the bolt in the bolt-detection image.

Another aspect of the present disclosure provides a bolt axial force measurement apparatus comprising a memory and a processor;

wherein the memory is configured for storing programs; and wherein the processor is configured for executing the programs stored in the memory to perform the steps of the above said bolt axial force measurement method.

Another aspect of the present disclosure provides a readable storage medium with a program stored thereon, wherein the program is configured for performing the steps of the above said bolt axial force measurement method when the program is executed by a processor.

From the above technical solution, provided are a bolt axial force measurement method, device, apparatus, and readable storage medium. The solution first captures images of bridge bolts by a movable imaging device and identifying an outer edge of a nut, a centroid of the nut, and a circular position of a laser spot at a center of the bolt in a captured image of the bridge bolt. When the outer edge of the nut, the centroid of the nut, and the circular position of the laser spot at the center of the bolt in the captured image of the bridge bolt meet preset conditions, a calibration laser spot is projected onto a bolt plate, and a current frame is obtained as a bolt-detection image. Then dimensional calibration is performed on the bolt-detection image based on a size of the calibration laser spot in the bolt-detection image, and a displacement of each of the pre-calibrated feature points on the bolt in the bolt-detection image is determined. Finally, a bolt axial force value is calculated based on the displacement of each of the pre-calibrated feature points on the bolt in the bolt-detection image.

The present disclosure utilizes the principle that when a bolt is tightened and subjected to a force, a bolt head will experience a certain degree of uneven deformation. As the bolt axial force changes, the horizontal displacement of the bolt head will also change. Even under a same axial force, the horizontal displacement of different positions on the bolt head will also vary. The present disclosure calibrates the specified bolts used in bridges to determine the relationship between the displacement of pre-calibrated feature points on the bolt and the bolt axial force. By capturing an image of the bridge bolt and analyzing the position of each of pre-calibrated feature points in the bolt-detection images, the bolt axial force can be measured non-destructively through the displacement of these pre-calibrated feature points. At the same time, since there is a direct relationship between strain and force, the bolt axial force can be directly obtained through the strain on the bolt head. Therefore, both loosening and non-loosening conditions that cause axial force loss can be contemplated. This allows for the identification of non-rotational loosening of bolts.

BRIEF DESCRIPTION OF DRAWINGS

To more clearly illustrate the embodiments of the present disclosure, the following will briefly introduce the accompanying drawings in connection with the embodiments of the present disclosure. Obviously, the accompanying drawings in the following description are only some of the embodiments of the present disclosure. For those skilled in the art, other drawings can be obtained based on these drawings without creative effort.

DETAILED DESCRIPTION

The following will clearly and completely describe the technical solutions in the embodiments of the present disclosure with reference to the accompanying drawings. Obviously, the described embodiments are only some of the embodiments of the present disclosure, rather than being exhaustive. Based on the embodiments in the present disclosure, all other embodiments obtained by those skilled in the art without creative effort shall fall within the protection scope of the present disclosure.

Before introducing the present disclosure, the basic principles of the present disclosure are first explained.

The present disclosure utilizes the principle that when a bolt is tightened and subjected to a force, a bolt head will experience a certain degree of uneven deformation. As the bolt axial force changes, the horizontal displacement of the bolt head will also change. Even under a same axial force, the horizontal displacement of different positions on the bolt head will also vary.

Figure 1:
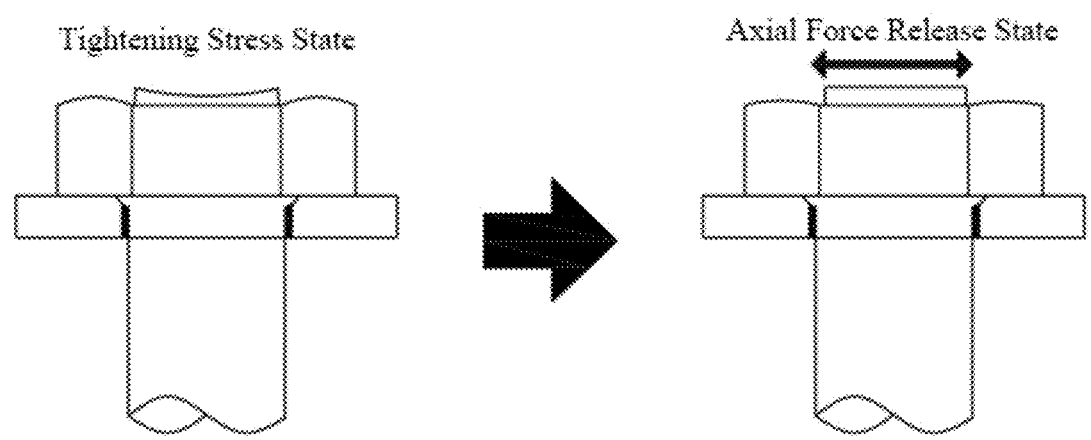
FIG. 1 is a schematic diagram of the deformation of a bolt head under force as disclosed in the present disclosure.

As shown in FIG. 1, when a bolt is tightened and subjected to a force, the bolt head will experience a certain degree of uneven deformation, wherein the center of the bolt head is concave while the outer side is convex and inwardly shrunk. When the bolt axial force is released, the entire bolt head is horizontal. That is, as long as the bolts used in bridges are pre-measured to obtain the relationship between the position of the bolt feature points and the bolt axial force, then a movable imaging device can be used to capture images of each bolt on the bridge, analyze the position of each of the pre-calibrated feature points in the images, and non-destructively measure the bolt axial force through the displacement of each of these feature points. Further, the degree of bolt loosening can be analyzed, and a re-tightening proposal can be provided.

Next, the solution of the present disclosure is introduced. The present disclosure proposes the following technical solution, as detailed described hereinafter.

Figure 2:
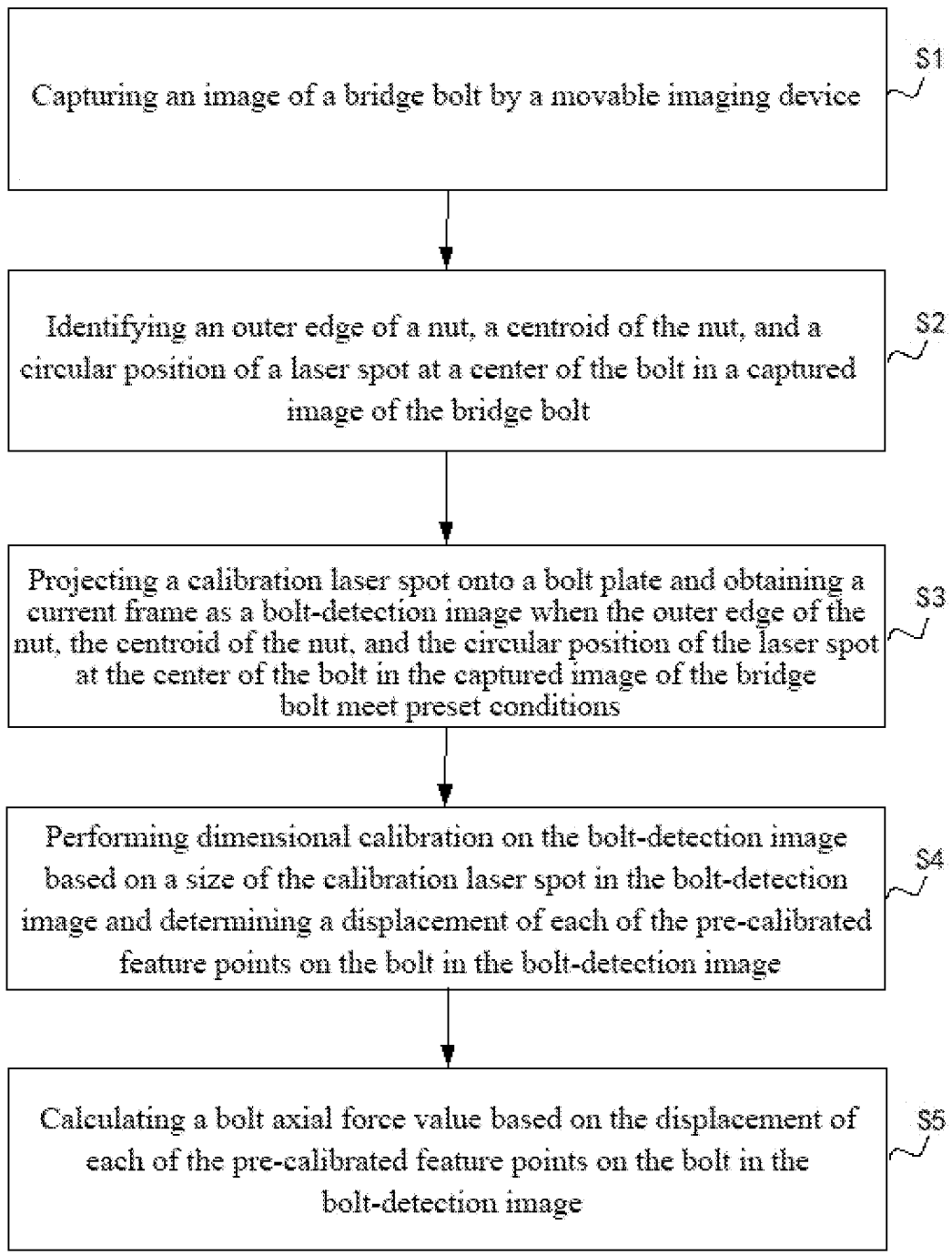
FIG. 2 is a flowchart of a bolt axial force measurement method as disclosed in the present disclosure.

FIG. 2 is a flowchart of a bolt axial force measurement method disclosed in an embodiment of the present disclosure. As shown in FIG. 2, the method may comprise steps of:

Step 1 (S1): capturing an image of the bridge bolt by a movable imaging device.

Figure 3:
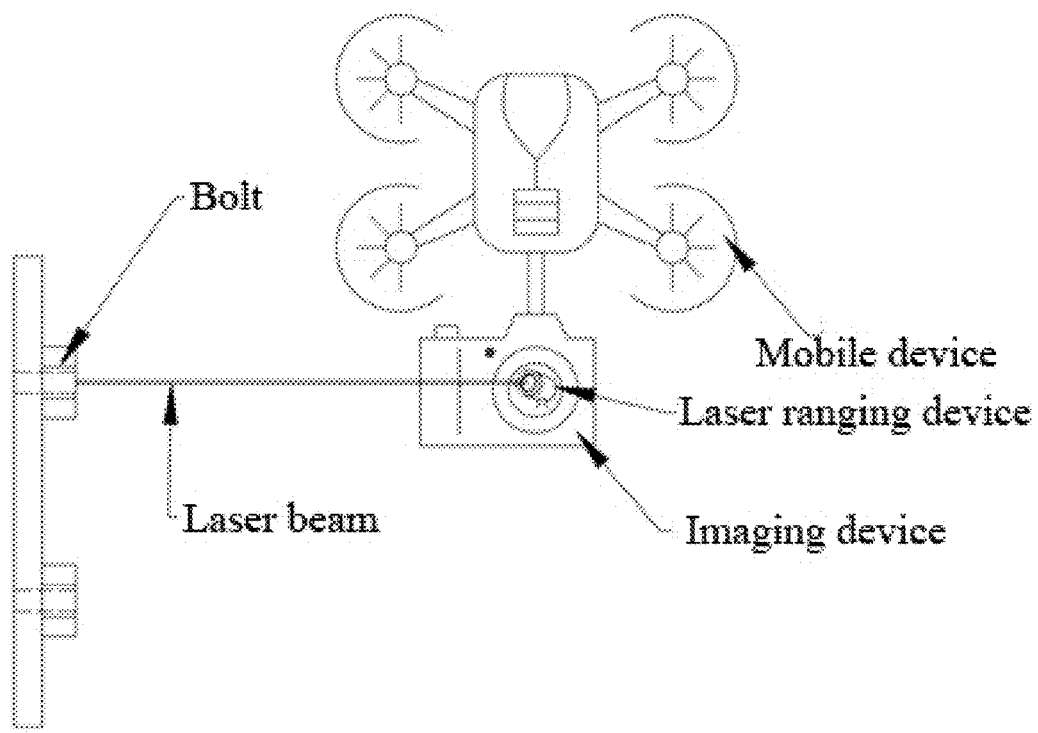
FIG. 3 is a schematic diagram of a movable imaging device capturing an image of a bridge bolt as disclosed in the present disclosure.

Specifically, as shown in FIG. 3, the movable imaging device comprises a mobile device and an imaging device, and further comprises a laser ranging device, such as a laser rangefinder. The mobile device may comprise a drone, which is configured to carry the imaging device, allowing operators to quickly capture images of bridge bolts from optimal angles. It can capture bolts in positions inaccessible to manual inspections and can be used in connection with regular drone inspections of bridge surface defects. The imaging device may comprise a high-speed camera, which is configured to capture high-definition images of bolts. The laser ranging device emits a laser beam in the direction of the lens axis, and the imaging device captures the bridge bolt image, to obtain a laser spot in the captured image of the bridge bolt.

Step 2 (S2): identifying an outer edge of a nut, a centroid of the nut, and a circular position of a laser spot at a center of the bolt in a captured image of the bridge bolt.

Step 3 (S3): projecting a calibration laser spot onto a bolt plate and obtaining a current frame as a bolt-detection image when the outer edge of the nut, the centroid of the nut, and the circular position of the laser spot at the center of the bolt in the captured image of the bridge bolt meet preset conditions.

Specifically, the nut in the captured image of the bridge bolt is identified. The outer edge of the nut is usually hexagonal shape. Based on geometric principles, the centroid position of the hexagon can be determined, while the circle formed by the laser spot can also be identified. Generally, the preset conditions may comprise:

1. The height of the hexagon identified from the outer edge of the nut accounts for 80% to 95% of the height of the bolt-detection image;
2. The outer edge of the nut is completely presented in the image, and each side of the hexagon is equal;
3. The centroid of the nut is within the circle formed by the laser spot.

Figure 4:
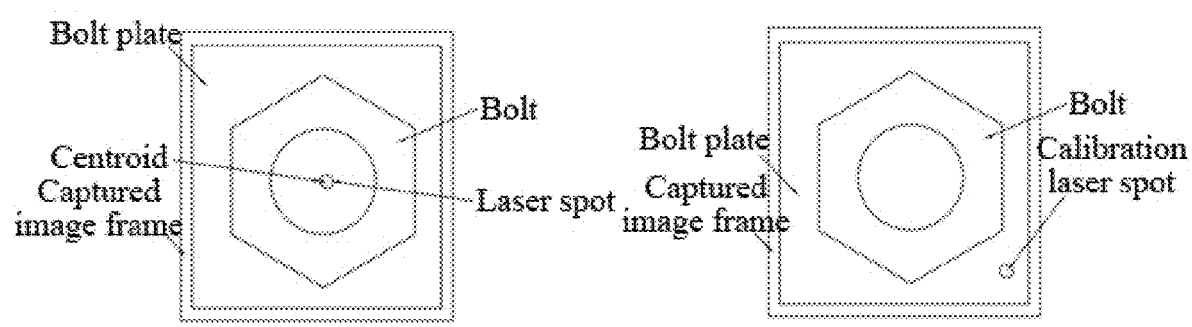
FIG. 4 is a schematic diagram of performing dimensional calibration of a bolt-detection image as disclosed in the present disclosure.

As shown in FIG. 4, when the captured image meets the above preset conditions, it indicates that the movable imaging device is currently right in front of the bolt, and the captured image is a frontal image of the bolt. This captured image can be used for subsequent bolt axial force analysis and calculation. At this time, the calibration laser spot needs to be projected onto the bolt plate, which is not subjected to force or has almost none deformation. The current frame can be obtained as a bolt-detection image, and dimensional calibration can be performed based on the size of the calibration laser spot in this image. If the captured image cannot meet the above preset conditions simultaneously, then adjustments are needed. Based on the outer edge of the nut, the centroid of the nut, and the circular position of the laser spot in the image, the program can automatically adjust the position, direction, and focal length of the movable imaging device until the captured image meets the preset conditions, finishing image positioning.

After identifying the outer edge of the nut, the centroid of the nut, and the circular position of the laser spot at the center of the bolt in the captured image of the bridge bolt, the method may further comprise a step of adjusting the position of the movable imaging device, specifically:

adjusting a shooting position of the movable imaging device based on the identified outer edge of the nut, the centroid of the nut, and the circular position of the laser spot in the captured image of the bridge bolt.

Step 4 (S4): performing dimensional calibration on the bolt-detection image based on a size of the calibration laser spot in the bolt-detection image and determining a displacement of each of pre-calibrated feature points on the bolt in the bolt-detection image.

Specifically, when an image that meets the preset conditions, i.e., the bolt-detection image, is captured, the laser rangefinder may record the distance between the movable imaging device and the bolt at the time of obtaining image. The relationship between the size of the calibration laser spot and such distance can be known through pre-calibration. Based on the distance recorded by the laser rangefinder and the calibration curve, an actual size of the calibration laser spot can be determined, and this actual size can be used to perform dimensional calibration on the image.

The feature points on the bolt head can be determined by spraying at the factory, or can be selected from the bolt's inherent feature points. For example, the pre-calibrated feature points can be selected from the midpoint of each side of the nut, the boundary point between the nut and the screw, and the centroid of the nut. The advantage of using the bolt's inherent feature points is that these feature points are unlikely to disappear due to environmental erosion. Since the bolt head is centrally symmetrical and the deformation is also centrally symmetrical, there is no need to perform initial angle calibration when the bolt is first tightened. Only the position of the feature points relative to the centroid of the nut needs to be detected, and the bolt axial force can be calculated based on the displacement of each of the pre-calibrated feature points on the bolt, making the operation more convenient.

Step 5 (S5): calculating a bolt axial force value based on the displacement of each of the pre-calibrated feature points on the bolt in the bolt-detection image.

Specifically, when a bolt is tightened and subjected to a force, the bolt head will experience a certain degree of uneven deformation. As the bolt axial force changes, the horizontal displacement of the bolt head will also change. Even under a same axial force, the horizontal displacement of different positions on the bolt head will also vary. Therefore, after obtaining the displacement of each of the pre-calibrated feature points on the bolt in the bolt-detection image, the bolt axial force value can be determined by the relationship between the position of the bolt feature points and the bolt axial force obtained through pre-testing of the bolts used in bridges.

From the above technical solution, provided are a bolt axial force measurement method, device, apparatus, and readable storage medium. The solution first captures images of bridge bolts by a movable imaging device and identify an outer edge of a nut, a centroid of the nut, and a circular position of a laser spot at a center of the bolt in a captured image of the bridge bolt. When the outer edge of the nut, the centroid of the nut, and the circular position of the laser spot at the center of the bolt in the captured image of the bridge bolt meet preset conditions, a calibration laser spot is projected onto a bolt plate, and the current frame is obtained as a bolt-detection image. Then dimensional calibration is performed on the bolt-detection image based on a size of the calibration laser spot in the bolt-detection image, and the displacement of each of the pre-calibrated feature points on the bolt in the bolt-detection image is determined. Finally, the bolt axial force value is calculated based on the displacement of each of the pre-calibrated feature points on the bolt in the bolt-detection image.

The present disclosure utilizes the principle that when a bolt is tightened and subjected to a force, the bolt head will experience a certain degree of uneven deformation. As the bolt axial force changes, the horizontal displacement of the bolt head will also change. Even under a same axial force, the horizontal displacement of different positions on the bolt head will also vary. The present disclosure calibrates the specified bolts used in bridges to determine the relationship between the displacement of pre-calibrated feature points on the bolt and the bolt axial force. By capturing an image of the bridge bolt and analyzing positions of each of pre-calibrated feature points in the bolt-detection images, the bolt axial force can be measured non-destructively through the displacement of these pre-calibrated feature points. At the same time, since there is a direct relationship between strain and force, the bolt axial force can be directly obtained through the strain on the bolt head. Therefore, both loosening and non-loosening conditions that cause axial force loss can be contemplated. This allows for the identification of non-rotational loosening of bolts.

In some embodiments of the present disclosure, the step S4 of performing dimensional calibration on the bolt-detection image based on a size of the calibration laser spot in the bolt-detection image and determining a displacement of pre-calibrated feature points on the bolt in the bolt-detection image is detailed described hereinafter, which may specifically comprise:

Step 41 (S41): determining an actual size of the calibration laser spot based on the size of the calibration laser spot in the bolt-detection image in connection with a corresponding dimensional calibration curve.

Step 42 (S42): performing dimensional calibration in the bolt-detection image based on the actual size of the calibration laser spot.

Specifically, when using image analysis, it is necessary to place a scale next to the bolt and obtain an image for dimensional calibration. This method is labor-intensive and it may not always be possible to place the scale next to the bolt. When using a drone with a camera to capture images, the distance between the drone and the bolt may vary. If a scale is used, it would need to be placed next to each bolt, which is cumbersome and impossible for hard-to-reach locations. This problem can be solved by the relationship between the size of the laser spot and the distance in laser range finding. In the present disclosure, the distance between the movable imaging device and the bolt is obtained by a laser rangefinder, and then the relationship curve between the distance ranging from the movable imaging device to the bolt and the actual size of the calibration laser spot, i.e., the dimensional calibration curve, is used in connection with the distance obtained by the laser rangefinder to determine the actual size of the calibration laser spot. Based on the actual size of the calibration laser spot, dimensional calibration is performed on the bolt-detection image. The step of performing dimensional calibration on the bolt-detection image based on the actual size of the calibration laser spot is specifically: based on the actual size of the calibration laser spot and the size of the calibration laser spot in the bolt-detection image, i.e., the number of pixels occupied by the calibration laser spot, the relationship between unit pixels and length can be converted, thereby finishing the dimensional calibration of the bolt-detection image.

Step 43 (S43): reading a position of each of the pre-calibrated feature points on the bolt in the bolt-detection image dimensionally calibrated, and calculating the displacement of each of the pre-calibrated feature points on the bolt in the bolt-detection image.

Specifically, the step of calculating the displacement of each of the pre-calibrated feature points on the bolt in the bolt-detection image may comprise the following two steps:

1. reading a position of each of the pre-calibrated feature points on the bolt in the bolt-detection image dimensionally calibrated; and 2. calculating the displacement of each of the pre-calibrated feature points on the bolt in the bolt-detection image by establishing a position of the pre-calibrated feature point at the centroid of the nut of the bolt in the bolt-detection image as an origin of a polar coordinate.

At this time, the entire image is in a polar coordinate system, and the displacement of each of the pre-calibrated feature points on the bolt is calculated by measuring the change in the polar radius r, i.e., the change in distance from the origin of polar coordinate.

In some embodiments of the present disclosure, the step of calculating a bolt axial force value based on the displacement of each of the pre-calibrated feature points on the bolt in the bolt-detection image is detailed desenbed hereinafter, which may comprise:

Step 51 (S51): obtaining a displacement-axial force curve according to the bolt type, where the displacement-axial force curve records the correspondence between the displacement of feature points and the bolt axial force value; and Step 52 (S52): determining the bolt axial force value based on the displacement of each of the pre-calibrated feature points on the bolt in the bolt-detection image in connection with the displacement-axial force curve.

Specifically, the step of determining the bolt axial force value based on the displacement of each of the pre-calibrated feature points on the bolt in connection with the displacement-axial force curve may comprise the following two steps:

1. determining axial force values at each position of each of the pre-calibrated feature points based on the displacement of the pre-calibrated feature points on the bolt in the bolt-detection image in connection with the displacement-axial force curve; and
2. determining an average of the axial force values at positions of pre-calibrated feature points as the bolt axial force value.

The displacement-axial force curve according to the bolt type is obtained through pre-measuring. Based on the correspondence between the displacement of each of the pre-calibrated feature points and the bolt axial force value in the displacement-axial force curve, the bolt axial force value can be determined. The positions of the pre-calibrated feature points on the bolt are not fixed and can be marked in advance or selected as structural feature points. The pre-calibrated feature points can be selected in a centrally symmetrical manner, with the centroid of the nut as the origin of the polar coordinate. Then, the average displacement can be calculated and converted to obtain the axial force. Alternatively, different feature points can be randomly selected, and their displacements can be converted to obtain the axial force, and then the average axial force can be calculated.

The following describes the bolt axial force measurement device provided by an embodiment of the present disclosure. The bolt axial force measurement device described below can be cross-referenced with the bolt axial force measurement method described above.

Figure 5:
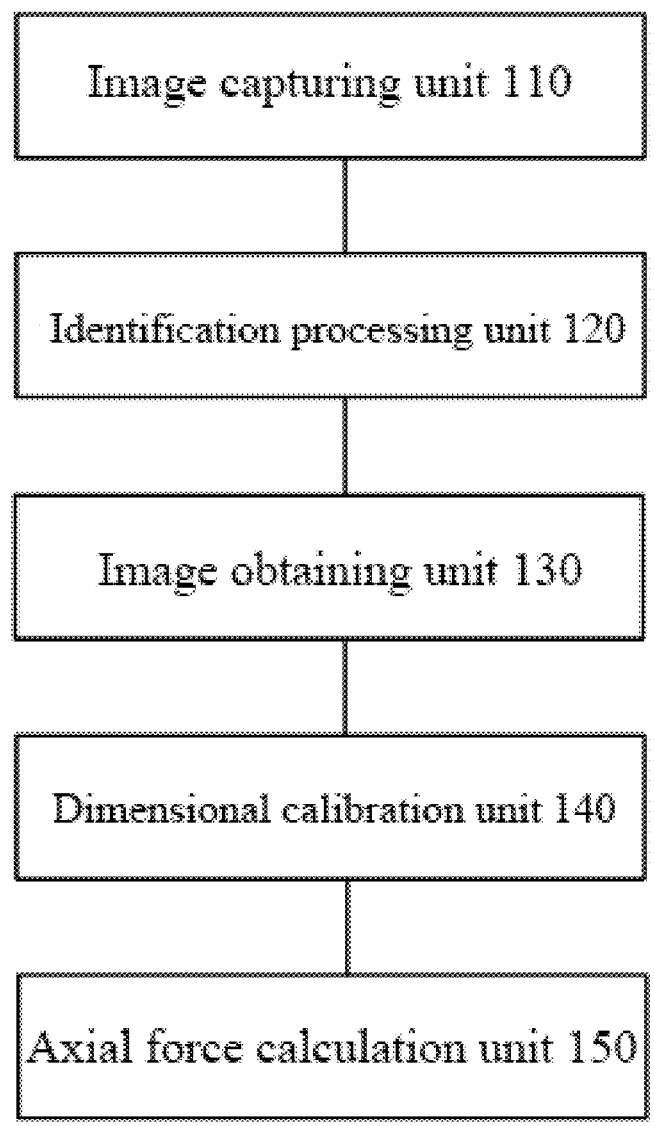
FIG. 5 is a structural block diagram of a bolt axial force measurement device as disclosed in the present disclosure.

Referring to FIG. 5, which is a schematic diagram of a bolt axial force measurement device as disclosed in an embodiment of the present disclosure.

As shown in FIG. 5, the bolt axial force measurement device may comprise:

an image capturing unit 110 for capturing an image of a bridge bolt by a movable imaging device;
an identification processing unit 120 for identifying an outer edge of a nut, a centroid of the nut, and a circular position of a laser spot at a center of the bolt in a captured image of the bridge bolt;
an image obtaining unit 130 for projecting a calibration laser spot onto a bolt plate and obtaining a current frame as a bolt-detection image when the outer edge of the nut, the centroid of the nut, and the circular position of the laser spot at the center of the bolt in the captured image of the bridge bolt meet preset conditions;
a dimensional calibration unit 140 for performing dimensional calibration on the bolt-detection image based on a size of the calibration laser spot in the bolt-detection image and determining a displacement of each of the pre-calibrated feature points on the bolt in the bolt-detection image; and
an axial force calculation unit 150 for calculating a bolt axial force value based on the displacement of each of the pre-calibrated feature points on the bolt in the bolt-detection image.

From the above technical solution, provided are a bolt axial force measurement method, device, apparatus, and readable storage medium. The solution first captures images of bridge bolts by a movable imaging device and identify an outer edge of a nut, a centroid of the nut, and a circular position of a laser spot at a center of the bolt in a captured image of the bridge bolt. When the outer edge of the nut, the centroid of the nut, and the circular position of the laser spot at the center of the bolt in the captured image of the bridge bolt meet preset conditions, a calibration laser spot is projected onto a bolt plate, and a current frame is obtained as a bolt-detection image. Then dimensional calibration is performed on the bolt-detection image based on a size of the calibration laser spot in the bolt-detection image, and a displacement of each of the pre-calibrated feature points on the bolt in the bolt-detection image is determined. Finally, a bolt axial force value is calculated based on the displacement of each of the pre-calibrated feature points on the bolt in the bolt-detection image.

The present disclosure utilizes the principle that when a bolt is tightened and subjected to a force, the bolt head will experience a certain degree of uneven deformation. As the bolt axial force changes, the horizontal displacement of the bolt head will also change. Even under a same axial force, the horizontal displacement of different positions on the bolt head will also vary. The present disclosure calibrates the specified bolts used in bridges to determine the relationship between the displacement of pre-calibrated feature points on the bolt and the bolt axial force. By capturing an image of the bridge bolt and analyzing the positions of each of pre-calibrated feature points in the bolt-detection images, the bolt axial force can be measured non-destructively through the displacement of these feature points. At the same time, since there is a direct relationship between strain and force, the bolt axial force can be directly obtained through the strain on the bolt head. Therefore, both loosening and non-loosening conditions that cause axial force loss can be contemplated. This allows for the identification of non-rotational loosening of bolts.

Optionally, the step of performing dimensional calibration on the bolt-detection image based on the size of the calibration laser spot in the bolt-detection image and determining the displacement of each of the pre-calibrated feature points on the bolt in the bolt-detection image by the dimensional calibration unit may comprise:

determining an actual size of the calibration laser spot based on the size of the calibration laser spot in the bolt-detection image in connection with a corresponding dimensional calibration curve;

performing dimensional calibration in the bolt-detection image based on the actual size of the calibration laser spot; and reading a position of each of the pre-calibrated feature points on the bolt in the bolt-detection image dimensionally calibrated, and calculating the displacement of each of the pre-calibrated feature points on the bolt in the bolt-detection image.

Optionally, the step of reading a position of each of the pre-calibrated feature points on the bolt in the bolt-detection image dimensionally calibrated, and calculating the displacement of the pre-calibrated feature points on the bolt in the bolt-detection image by the dimensional calibration unit may comprise:

reading the position of each of the pre-calibrated feature points on the bolt in the bolt-detection image dimensionally calibrated; and calculating the displacement of the pre-calibrated feature points on the bolt in the bolt-detection image by establishing a position of the pre-calibrated feature point at the centroid of the nut of the bolt in the bolt-detection image as an origin of a polar coordinate.

Optionally, the pre-calibrated feature points comprise a midpoint of each side of the nut, a boundary point between the nut and the screw, and a centroid of the nut.

Optionally, the step of calculating a bolt axial force value based on the displacement of each of the pre-calibrated feature points on the bolt in the bolt-detection image by the axial force calculation unit may comprise:

obtaining a displacement-axial force curve according to the bolt type, where the displacement-axial force curve records the correspondence between the displacement of feature points and the bolt axial force value; and determining the bolt axial force value based on the displacement of each of the pre-calibrated feature points on the bolt in the bolt-detection image in connection with the displacement-axial force curve.

Optionally, the step of determining the bolt axial force value based on the displacement of each of the pre-calibrated feature points on the bolt in the bolt-detection image in connection with the displacement-axial force curve by the axial force calculation unit may comprise:

determining axial force values at a position of each of the pre-calibrated feature points based on the displacement of the pre-calibrated feature points on the bolt in the bolt-detection image in connection with the displacement-axial force curve; and determining an average of the axial force values at positions of pre-calibrated feature points as the bolt axial force value.

Optionally, the identification processing unit may be further configured for adjusting a capturing position of the movable imaging device based on the identified outer edge of the nut, the centroid of the nut, and the circular position of the laser spot in the captured image of the bridge bolt after the step of identifying the outer edge of the nut, the centroid of the nut, and the circular position of the laser spot at the center of the bolt in the captured image of the bridge bolt.

Figure 6:
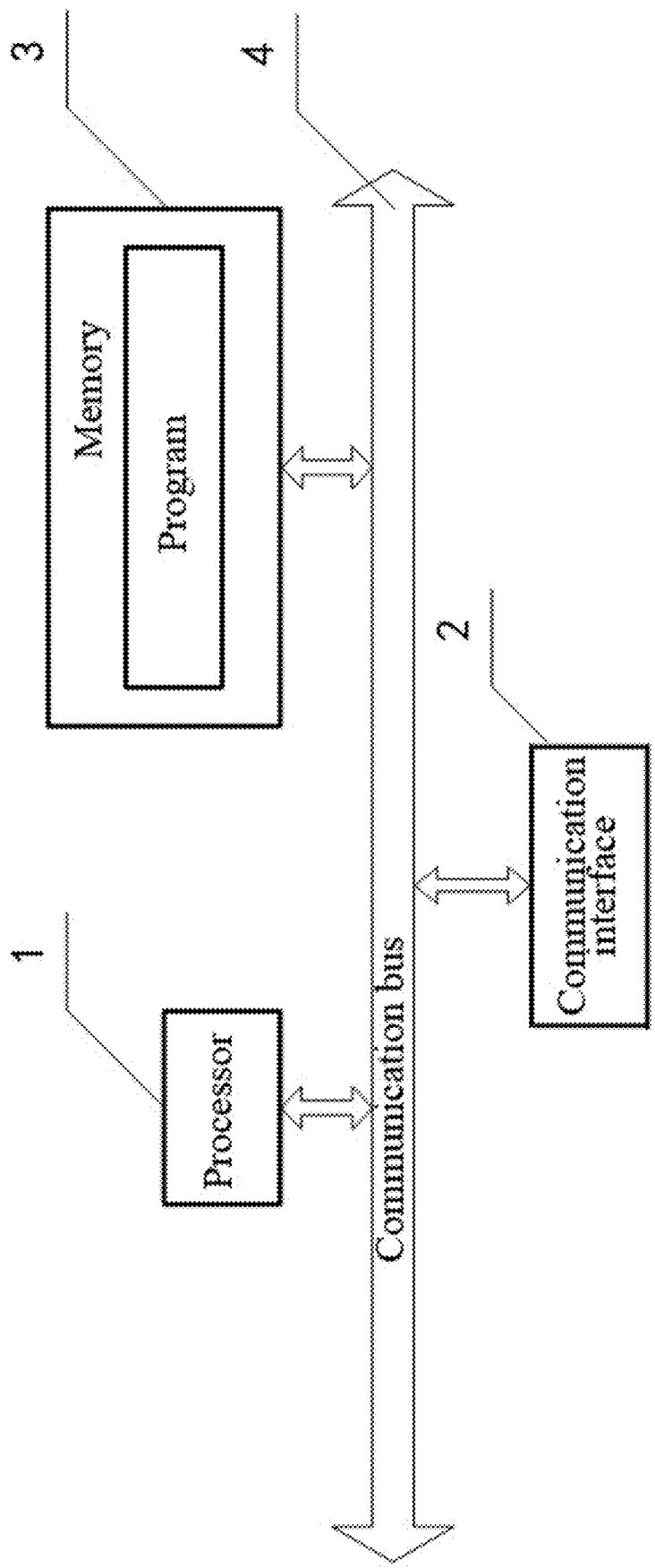
FIG. 6 is a hardware structural block diagram of a bolt axial force measurement apparatus as disclosed in the present disclosure.

The bolt axial force measurement device provided by one embodiment of the present disclosure can be applied to a bolt axial force measurement apparatus. FIG. 6 shows the hardware structural block diagram of the bolt axial force measurement apparatus. Referring to FIG. 6, the hardware structure of the bolt axial force measurement apparatus may comprise: at least one processor 1, at least one communication interface 2, at least one memory 3, and at least one communication bus 4;

In one embodiment of the present disclosure, there are at least one processor 1, at least one communication interface 2, at least one memory 3, and at least one communication bus 4, wherein the processor 1, communication interface 2, and memory 3 communicate with each other through the communication bus 4;

The processor 1 may be a central processing unit (CPU), or an application-specific integrated circuit (ASIC), or one or more integrated circuits configured to implement the embodiment of the present disclosure;

The memory 3 may comprise a high-speed RAM memory and may also comprise non-volatile memory, such as at least one disk memory, wherein the memory is configured for storing a program, and the processor may be configured for executing the program stored in the memory. The program is configured for:

capturing an image of a bridge bolt by a movable imaging device;

identifying an outer edge of a nut, a centroid of the nut, and a circular position of a laser spot at a center of the bolt in a captured image of the bridge bolt;

projecting a calibration laser spot onto a bolt plate and obtaining a current frame as a bolt-detection image when the outer edge of the nut, the centroid of the nut, and the circular position of the laser spot at the center of the bolt in the captured image of the bridge bolt meet preset conditions;

performing dimensional calibration on the bolt-detection image based on a size of the calibration laser spot in the bolt-detection image and determining a displacement of each of the pre-calibrated feature points on the bolt in the bolt-detection image; and calculating a bolt axial force value based on the displacement of each of the pre-calibrated feature points on the bolt in the bolt-detection image.

Optionally, refinement and extension functions of the program may be referred to the above description.

One embodiment of the present disclosure further provides a readable storage medium. The readable storage medium may store a program suitable for execution by a processor, wherein the program is configured for:

capturing an image of a bridge bolt by a movable imaging device;

identifying an outer edge of a nut, a centroid of the nut, and a circular position of a laser spot at a center of the bolt in a captured image of the bridge bolt;

projecting a calibration laser spot onto a bolt plate and obtaining a current frame as a bolt-detection image when the outer edge of the nut, the centroid of the nut, and the circular position of the laser spot at the center of the bolt in the captured image of the bridge bolt meet preset conditions;

performing dimensional calibration on the bolt-detection image based on a size of the calibration laser spot in the bolt-detection image and determining a displacement of pre-calibrated feature points on the bolt in the bolt-detection image; and calculating a bolt axial force value based on the displacement of each of the pre-calibrated feature points on the bolt in the bolt-detection image.

Optionally, refinement and extension functions of the program may be referred to the above description.

Finally, it should be noted that in the present disclosure, relational terms such as "first" and "second" are used only to distinguish one object or operation from another object or operation, and do not necessarily require or imply any actual relationship or order between these objects or operations.

Moreover, the terms "comprise", "include" or any other variations thereof are intended to cover non-exclusive inclusion, so that a process, method, article, or device that comprises a series of elements comprises not only those elements but also other elements not explicitly listed, or elements inherent to such a process, method, article, or device. Without further limitation, an element defined by the phrase "comprising a . . . " does not exclude the presence of additional identical elements in the process, method, article, or device that includes the element.

Various embodiments in the present disclosure are described in a progressive manner, with each embodiment focusing on the differences from other embodiments. The same or similar parts between the various embodiments can be referred to each other.

The above description of the disclosed embodiments enables those skilled in the art to implement or use the present disclosure. Various modifications to these embodiments will be apparent to those skilled in the art, and the general principles defined herein can be implemented in other embodiments without departing from the spirit or protection scope of the present disclosure. Therefore, the present disclosure is not limited to the embodiments shown herein but is to be accorded the widest scope consistent with the principles and novel features disclosed herein.

What is claimed is:

1. A bolt axial force measurement method, comprising steps of:
   capturing an image of a bridge bolt by a movable imaging device;
   identifying an outer edge of a nut, a centroid of the nut, and a circular position of a laser spot at a center of the bridge bolt in the captured image of the bridge bolt;
   projecting a calibration laser spot onto a bolt plate and obtaining a current frame as a bolt-detection image when the outer edge of the nut, the centroid of the nut, and the circular position of the laser spot at the center of the bridge bolt in the captured image of the bridge bolt meet preset conditions;
   performing dimensional calibration on the bolt-detection image based on a size of the calibration laser spot in the bolt-detection image and determining a displacement of pre-calibrated feature points on the bridge bolt in the bolt-detection image;
   calculating a bolt axial force value based on the displacement of each of the pre-calibrated feature points on the bridge bolt in the bolt-detection image;
   wherein the step of performing dimensional calibration on the bolt-detection image based on a size of the calibration laser spot in the bolt-detection image and determining a displacement of each of the pre-calibrated feature points on the bridge bolt in the bolt-detection image comprises:
   determining an actual size of the calibration laser spot based on the size of the calibration laser spot in the bolt-detection image in connection with a corresponding dimensional calibration curve;
   performing dimensional calibration in the bolt-detection image based on the actual size of the calibration laser spot;
   reading a position of each of the pre-calibrated feature points on the bridge bolt in the bolt-detection image dimensionally calibrated; and
   calculating the displacement of each of the pre-calibrated feature points on the bridge bolt in the bolt-detection image by establishing a position of the pre-calibrated feature point at the centroid of the nut of the bridge bolt in the bolt-detection image as an origin of a polar coordinate.

2. The method of claim 1, wherein the pre-calibrated feature points comprise a midpoint of each side of the nut, a boundary point between the nut and screw, and a centroid of the nut.

3. The method of claim 1, wherein the step of calculating a bolt axial force value based on the displacement of each of the pre-calibrated feature points on the bridge bolt in the bolt-detection image comprises:
   obtaining a displacement-axial force curve according to a bolt type, where the displacement-axial force curve records a correspondence between the displacement of feature points and the bolt axial force value; and
   determining the bolt axial force value based on the displacement of each of the pre-calibrated feature points on the bridge bolt in the bolt-detection image in connection with the displacement-axial force curve.

4. The method of claim 3, wherein the step of determining the bolt axial force value based on the displacement of each pre-calibrated feature point on the bridge bolt in the bolt-detection image in connection with the displacement-axial force curve comprises:
   determining the axial force value at a position of each of the pre-calibrated feature points based on the displacement of the pre-calibrated feature points on the bridge bolt in the bolt-detection image in connection with the displacement-axial force curve; and
   determining an average of the axial force values at positions each of the pre-calibrated feature points as a bolt axial force value.

5. The method of claim 1, wherein after the step of identifying the outer edge of a nut, the centroid of the nut, and the circular position of the laser spot at the center of the bridge bolt in the captured image of the bridge bolt, the method further comprises a step of:
   adjusting a capturing position of the movable imaging device based on the identified outer edge of the nut, the centroid of the nut, and the circular position of the laser spot in the captured image of the bridge bolt.

6. A bolt axial force measurement device, comprising:
   an image capturing unit for capturing an image of a bridge bolt by a movable imaging device;
   an identification processing unit for identifying an outer edge of a nut, a centroid of the nut, and a circular position of a laser spot at a center of the bridge bolt in the captured image of the bridge bolt;
   an image obtaining unit for projecting a calibration laser spot onto a bolt plate and obtaining a current frame as a bolt-detection image when the outer edge of the nut, the centroid of the nut, and the circular position of the laser spot at the center of the bridge bolt in the captured image of the bridge bolt meet preset conditions;
   a dimensional calibration unit for performing dimensional calibration on the bolt-detection image based on a size of the calibration laser spot in the bolt-detection image and determining a displacement of each of the pre-calibrated feature points on the bridge bolt in the bolt-detection image; and
   an axial force calculation unit for calculating a bolt axial force value based on the displacement of each of the pre-calibrated feature points on the bridge bolt in the bolt-detection image;
   wherein the dimensional calibration on the bolt-detection image based on a size of the calibration laser spot in the bolt-detection image and determination of a displacement of each of the pre-calibrated feature points on the bridge bolt in the bolt-detection image are performed by:
determining an actual size of the calibration laser spot based on the size of the calibration laser spot in the bolt-detection image and a corresponding dimensional calibration curve;
performing dimensional calibration in the bolt-detection image based on the actual size of the calibration laser spot;
reading a position of each of the pre-calibrated feature points on the bridge bolt in the bolt-detection image dimensionally calibrated; and
calculating the displacement of each of the pre-calibrated feature points on the bridge bolt in the bolt-detection image by establishing a position of each of the pre-calibrated feature points at a centroid of the nut of the bridge bolt as an origin of a polar coordinate.

7. A bolt axial force measurement apparatus, comprising a memory and a processor, wherein the memory is configured for storing programs; and
the processor is configured for executing the programs stored in the memory to perform the steps of the bolt axial force measurement method according to claim 1.

8. A bolt axial force measurement apparatus, comprising a memory and a processor, wherein
the memory is configured for storing programs; and
the processor is configured for executing the programs stored in the memory to perform the steps of the bolt axial force measurement method according to claim 2.

9. A bolt axial force measurement apparatus, comprising a memory and a processor, wherein
the memory is configured for storing programs; and
the processor is configured for executing the programs stored in the memory to perform the steps of the bolt axial force measurement method according to claim 3.

10. A bolt axial force measurement apparatus, comprising a memory and a processor, wherein
the memory is configured for storing programs; and
the processor is configured for executing the programs stored in the memory to perform the steps of the bolt axial force measurement method according to claim 4.

11. A bolt axial force measurement apparatus, comprising a memory and a processor, wherein
the memory is configured for storing programs; and
the processor is configured for executing the programs stored in the memory to perform the steps of the bolt axial force measurement method according to claim 5.

12. A non-transitory readable storage medium storing a program, wherein the program is configured for performing the steps of the bolt axial force measurement method according to claim 1 when the program is executed by a processor.

13. A non-transitory readable storage medium storing a program, wherein the program is configured for performing the steps of the bolt axial force measurement method according to claim 2 when the program is executed by a processor.

14. A non-transitory readable storage medium storing a program, wherein the program is configured for performing the steps of the bolt axial force measurement method according to claim 3 when the program is executed by a processor.

15. A non-transitory readable storage medium storing a program, wherein the program is configured for performing the steps of the bolt axial force measurement method according to claim 4 when the program is executed by a processor.

16. A non-transitory readable storage medium storing a program, wherein the program is configured for performing the steps of the bolt axial force measurement method according to claim 5 when the program is executed by a processor.

* * * * *